US010970687B2

(12) United States Patent
Agrawal et al.

(10) Patent No.: US 10,970,687 B2
(45) Date of Patent: Apr. 6, 2021

(54) ROUTING TRANSACTION DATA OVER A DATA PIPE (71) Applicant: MOTOROLA MOBILITY LLC, Chicago, IL (US)

(72) Inventors: Amit Kumar Agrawal, Bangalore (IN); Vishal Patil, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 465 days.

(21) Appl. No.: 15/166,018

(22) Filed: May 26, 2016

(65) Prior Publication Data

US 2017/0344962 A1 Nov. 30, 2017

(51) Int. Cl.
*G06Q 20/08* (2012.01)
*G06Q 20/16* (2012.01)
*G06Q 20/00* (2012.01)
*G06Q 20/10* (2012.01)
*G06Q 20/30* (2012.01)
*H04L 29/06* (2006.01)

(52) U.S. Cl.
CPC ....... *G06Q 20/085* (2013.01); *H04L 65/1069* (2013.01)

(58) Field of Classification Search
CPC .... G06Q 20/327; G06Q 20/401; G06Q 20/30; G06Q 30/0267; G06Q 20/3255; G06Q 20/3278; G06Q 20/405
See application file for complete search history.

(56) References Cited

U.S. PATENT DOCUMENTS

| 9,111,268 | B2* | 8/2015 | Blachman | H04L 67/125 |
|---|---|---|---|---|
| 10,410,209 | B2* | 9/2019 | Boyle | G06Q 20/3678 |
| 10,489,772 | B2* | 11/2019 | Forte | G06Q 20/085 |
| 2002/0055975 | A1* | 5/2002 | Petrovykh | H04M 7/003 |
| | | | | 709/205 |
| 2003/0056092 | A1* | 3/2003 | Edgett | H04L 63/0442 |
| | | | | 713/153 |

(Continued)

OTHER PUBLICATIONS

Ari Fogel, Stanley Fung, Luis Pedrosa, Meg Walraed-Sullivan, Ramesh Govindan, Ratul Mahajan Todd Millstein, "A General Approach to Network Configuration Analysis", USENIX, May 4-6, 2015 • Oakland, CA, USA. ISBN 978-1-931971-218, pp. 472-478 (Year: 2015).*

(Continued)

*Primary Examiner* — Christopher Bridges
*Assistant Examiner* — Tony P Kanaan
(74) *Attorney, Agent, or Firm* — Yudell Isidore PLLC (57) ABSTRACT

A method and system for facilitating, via a first device, an electronic financial transaction with a second device having limited network connectivity. The method includes the first device detecting initiation of a financial transaction with the second device. The financial transaction is remotely processed by a transaction service. The method further includes facilitating an establishment of a data pipe that directly connects the first device and the second device to enable the second device to exchange transaction data with the transaction service, via the first device operating as an intermediary device. In response to the data pipe being established, the first device routes, via the primary connection to the transaction service, all transaction data received from the second device over the data pipe.

19 Claims, 7 Drawing Sheets

(56) References Cited

U.S. PATENT DOCUMENTS

| | | | | |
|---|---|---|---|---|
| 2008/0238610 | A1* | 10/2008 | Rosenberg | G06Q 30/0281 340/5.7 |
| 2011/0158129 | A1* | 6/2011 | Liu | H04L 65/1076 370/259 |
| 2013/0179343 | A1* | 7/2013 | McCarley | G06Q 20/1085 705/43 |
| 2013/0179352 | A1* | 7/2013 | Dwyre | G06Q 20/327 705/71 |
| 2014/0244009 | A1* | 8/2014 | Mestas | G16H 40/63 700/91 |
| 2014/0254499 | A1* | 9/2014 | Hassan | H04W 12/08 370/329 |
| 2015/0188949 | A1* | 7/2015 | Mahaffey | H04W 12/0027 726/1 |
| 2015/0339318 | A1* | 11/2015 | O'Toole | G06Q 20/223 705/40 |
| 2017/0178090 | A1* | 6/2017 | Sarin | G06Q 20/3224 |
| 2017/0331724 | A1* | 11/2017 | Carney | H04L 47/825 |
| 2018/0060838 | A1* | 3/2018 | Agrawal | G06Q 20/20 |

OTHER PUBLICATIONS

O'Brien, Terrence, "Google Wallet Moves to the Cloud Opens Up to All Credit and Debit Cards", engadget.com, Aug. 1, 2012, downloaded from the internet May 31, 2016, http://www.engadget.com/2012/08/01/google-wallet-moves-to-the-cloud-opens-up-to-all-credit-and-deb/.

Modgil, Shweta, "Paytm's New Sound Pay Feature", Inc42.com, Jan. 15, 2016, downloaded from the internet May 31, 2016, https://inc42.com/flash-feed/paytms-new-sound-pay-feature/.

\* cited by examiner

ROUTING TRANSACTION DATA OVER A DATA PIPE

BACKGROUND

1. Technical Field

The present disclosure generally relates to electronic devices and in particular to an improved method for facilitating an electronic financial transaction between a transaction service and a device having limited network connectivity.

2. Description of the Related Art

Electronic and/or mobile payment transactions are common in today's global marketplace. The ubiquity of mobile devices has led to the rise of cloud-based payment services that enable users of mobile devices to quickly exchange funds or perform financial transactions with other users and/or merchants without the use of a dedicated point of sale terminal. However, one limitation commonly associated with cloud-based transactions between two devices is that both a payer device and a payee device must both be connected to a cloud-based payment service in order to complete the transaction. In circumstances where one device does not have an internet connection, such as when one device has a poor cellular service connection, the transaction would fail. Additionally, traditional payment systems, such as a credit card imprinter and retail point-of-sale systems, require cumbersome and/or expensive equipment which may not be practical for mobile payments using cloud-based payment services.

BRIEF DESCRIPTION OF THE DRAWINGS

The description of the illustrative embodiments is to be read in conjunction with the accompanying drawings, wherein.

DETAILED DESCRIPTION

The illustrative embodiments provide a method and a system for facilitating, via a first device, an electronic financial transaction with a second device having limited network connectivity. The method includes the first device detecting initiation of a financial transaction with the second device. The financial transaction is remotely processed by a transaction service. The first device is connected to the transaction service via a primary connection that meets a minimum connection service criteria. The second device does not have a connection to the transaction service that meets the minimum connection service criteria. The method further includes facilitating an establishment of a data pipe that directly connects the first device and the second device to enable the second device to exchange transaction data with the transaction service, via the first device operating as an intermediary device. In response to the data pipe being established, the first device routes, via the primary connection to the transaction service, all transaction data received from the second device over the data pipe.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the following figures and the remaining detailed written description. The above as well as additional objectives, features, and advantages of the present disclosure will become apparent in the following detailed description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Figure 1:
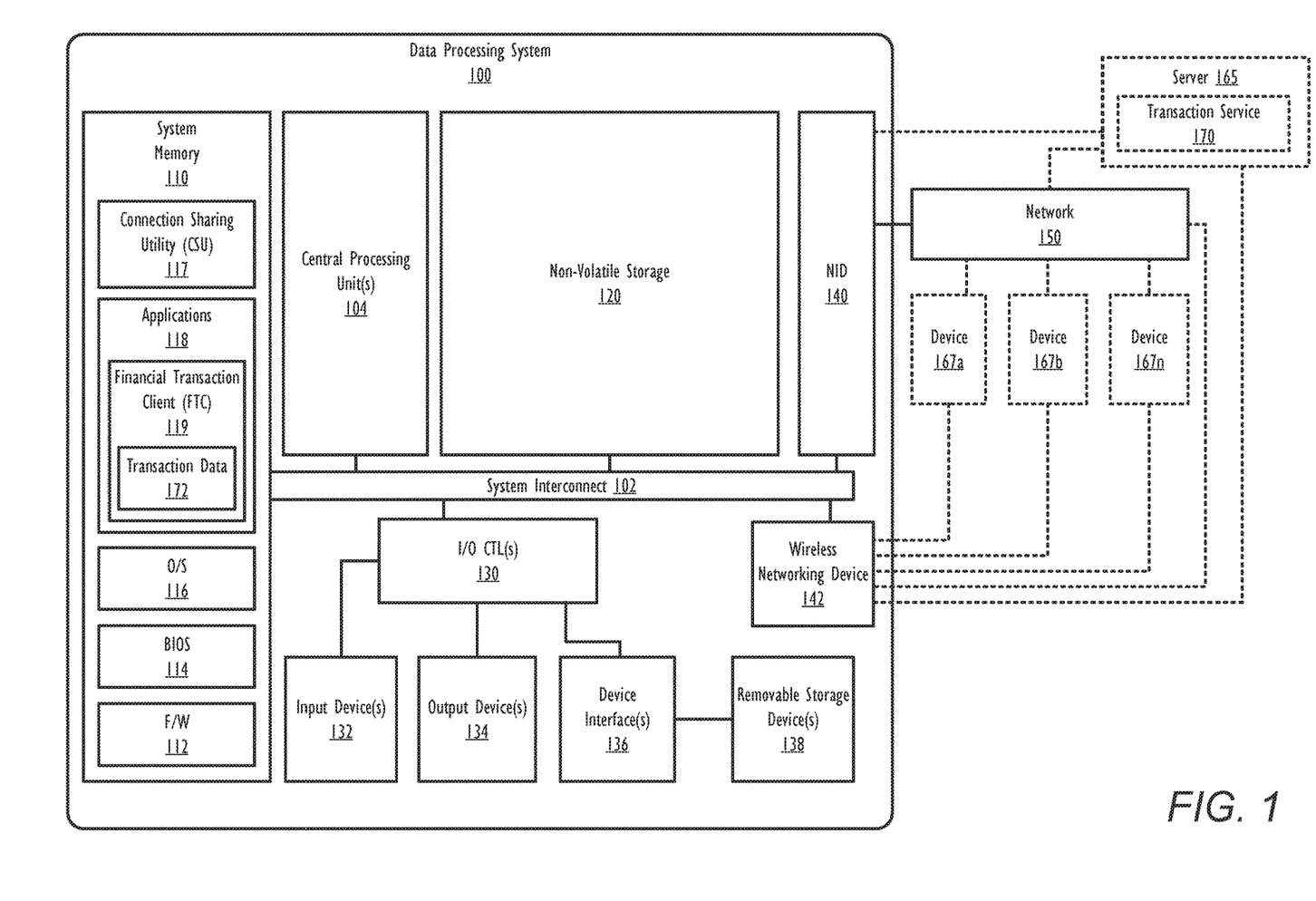
FIG. 1 provides a block diagram representation of an example data processing system within which certain aspects of the disclosure can be practiced, in accordance with one or more embodiments.

Those of ordinary skill in the art will appreciate that the hardware components and basic configuration depicted in the following figures may vary. For example, the illustrative components within data processing system 100 are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

With reference now to the figures, and beginning with FIG. 1, there is depicted a block diagram representation of an example data processing system (DPS) 100, within which one or more of the described features of the various embodiments of the disclosure can be implemented. In one embodiment, DPS 100 can be any electronic device such as, but not limited to, a desktop computer, notebook computer, mobile phone, smart watch, camera, video recorder, or tablet.

DPS 100 includes at least one processor or central processing unit (CPU) 104 coupled to system memory 110 and non-volatile storage 120 via system interconnect 102. System interconnect 102 can be interchangeably referred to as a system bus, in one or more embodiments. One or more software and/or firmware modules can be loaded into system memory 110 during operation of DPS 100. Specifically, in one embodiment, system memory 110 can include therein a plurality of such modules, including one or more of firmware (F/W) 112, basic input/output system (BIOS) 114, operating system (OS) 116, connection sharing utility (CSU) 117, and application(s) 118. These software and/or firmware modules provide varying functionality when their corresponding program code is executed by CPU 104 or by secondary processing devices within DPS 100. In one embodiment, Application(s) 118 may include financial transaction client (FTC) 119, which is configured to initiate and/or execute financial transactions with at least one other device, including but not limited to, devices 167a-n, server 165, and any other devices connected to network 150. In one embodiment, FTC 119 may interface the local device (DPS 100) with a remote and/or cloud-based transaction service, such as transaction service 170 of server 165.

Figure 3:
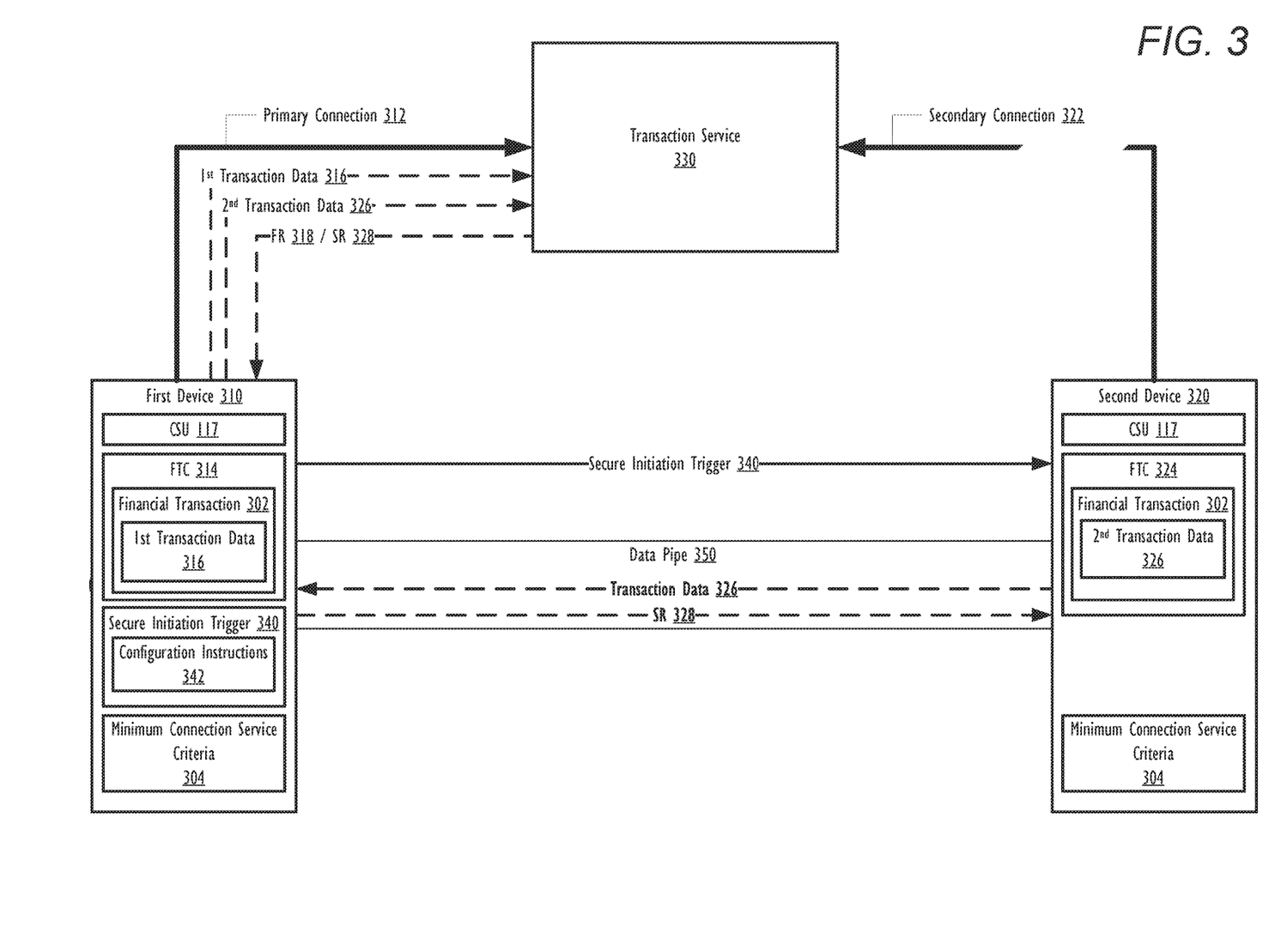
FIG. 3 illustrates an example first device configured to route transaction data received from a second device to a transaction service via a data pipe, in accordance with one or more embodiments.
Figure 4:
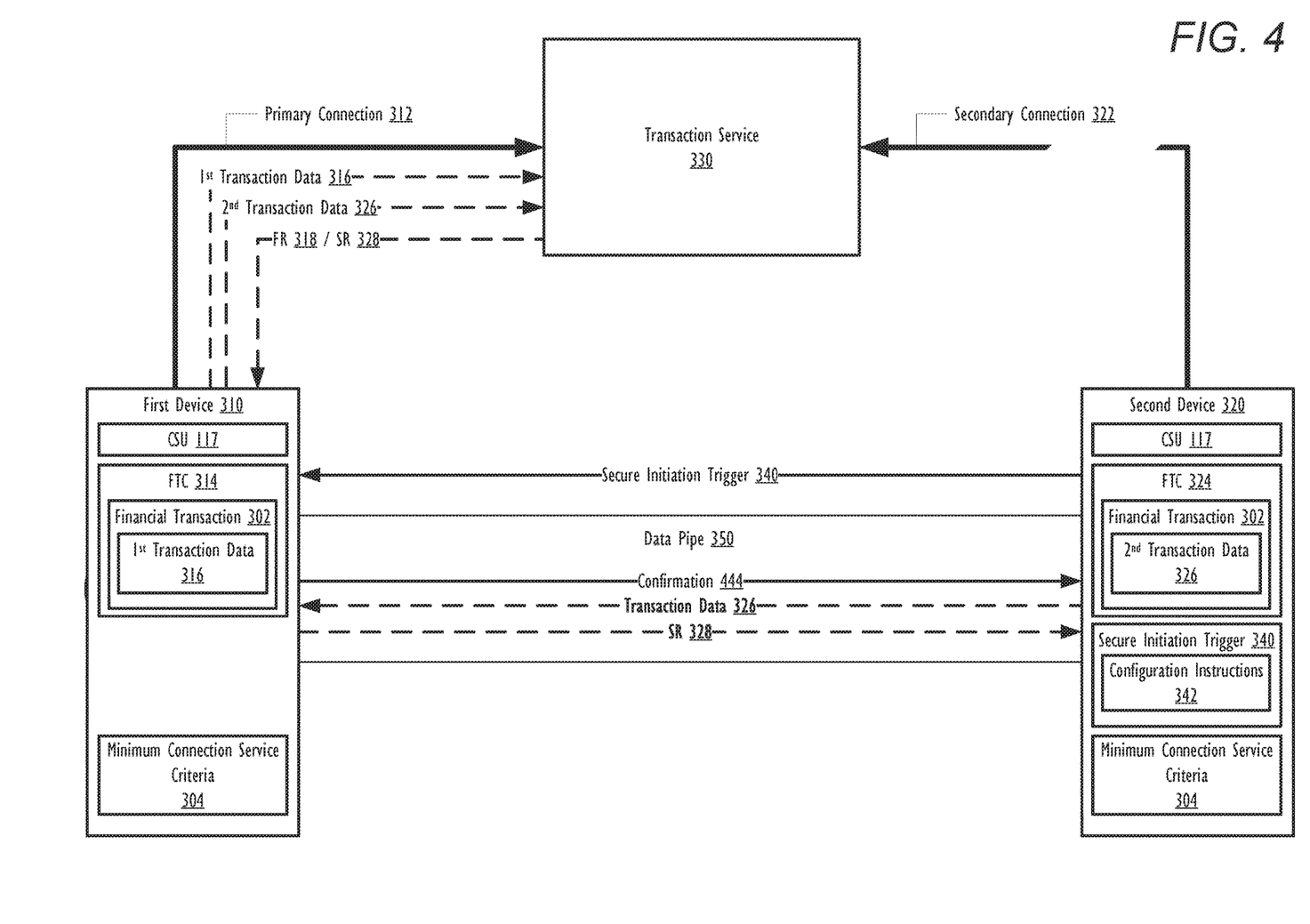
FIG. 4 illustrates an example second device configured to transmit transaction data for a financial transaction to a first device for rerouting to a transaction service, in accordance with one or more embodiments.
Figure 5:
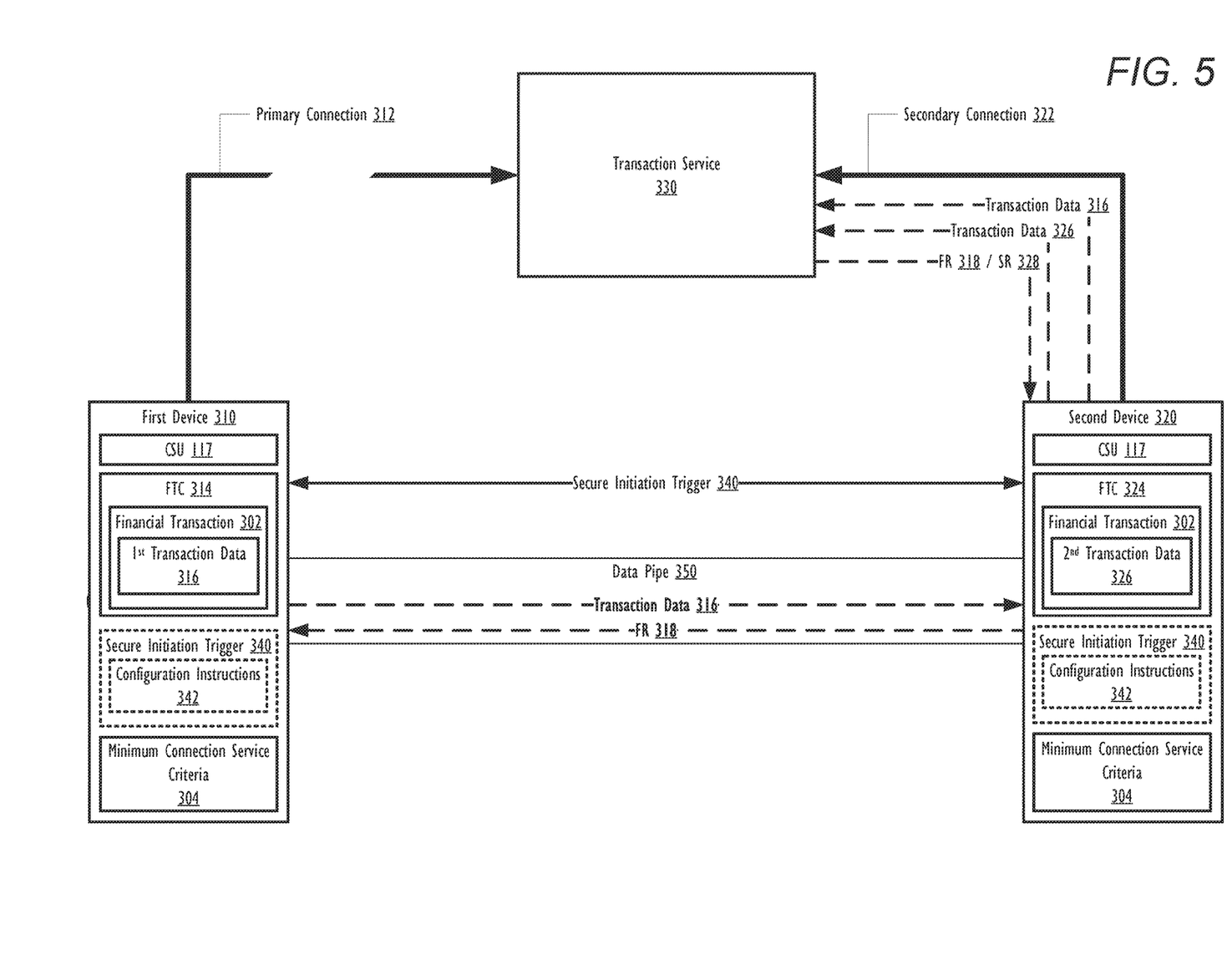
FIG. 5 illustrates an example first device configured to transmit transaction data for a financial transaction to a second device for rerouting to a transaction service, in accordance with one or more embodiments.

CSU 117 executes within DPS 100 to perform the various methods and functions described herein. According to one aspect of the disclosure, and as illustrated by FIGS. 3-5, which are described later, a financial transaction involves a first device, a second device, and a financial service, where the first device operates as an intermediary device to complete, at the financial service, the financial transaction which requires the first device and the second device both access and/or exchange transaction data with the transaction service. As presented herein, DPS 100 can be utilized as either the first device or the second device in this transaction and CSU 117 can include the required program modules to support both processes.

In one embodiment, DPS 100 is an intermediary device and CSU 117 configures processor 104/DPS 100 to detect initiation of a financial transaction by/with another device (e.g. device 167a) and to establish a data pipe with the other device. In one or more embodiments, CSU 117 may be used to route, to transaction service 170 via an existing connection, transaction data 172 that is received via the data pipe from the other device (device 167a), and intended for transaction service 170. In one or more other/alternate embodiments, DPS 100 operates as the other device and CSU 117 may be used to transmit, via the data pipe to the intermediary device (167a), transaction data 172 that is intended for transaction service 170. In this alternate embodiment, the intermediary device (167a) is configured to route the transaction data 172 to transaction service 170 on receipt from DPS 100. In an alternate embodiment, portions of CSU 117 may be separated into a first connection sharing module that executes on the intermediary device (DPS 100) and a second connection module that executes on the other device (device 167a). The first connection sharing module may configure a processor (104) on the intermediary device (DPS 100) to route, to transaction service 170 via an existing connection, transaction data 172 that is received via the data pipe from the other device (device 167a). The second connection sharing module may configure the other device (device 167a) to transmit, via the data pipe to the intermediary device (DPS 100), transaction data 172 that is intended for transaction service 170.

For simplicity, CSU 117 is illustrated and described as a stand-alone or separate software/firmware/logic component, which provides the specific functions and methods described herein. However, in at least one embodiment, CSU 117 may be a component of, may be combined with, or may be incorporated within firmware of DPS 100, or within OS 116, and/or within one or more of applications 118, particularly FTC 119. In another embodiment, CSU 117 may be a plugin module that integrates within FTC 119, an internet browser of application(s) 118, and/or at least one network protocol layer (not pictured) of DPS 100.

DPS 100 further includes one or more input/output (I/O) controllers 130, which support connection by and processing of signals from one or more connected input device(s) 132, such as a keyboard, mouse, hardware button(s), touch screen, infrared (IR) sensor, fingerprint scanner, or microphone. I/O controllers 130 also support connection with and forwarding of output signals to one or more connected output devices 134, such as monitors/displays and audio speaker(s). Additionally, in one or more embodiments, one or more device interfaces 136, such as an optical reader, a universal serial bus (USB), a card reader, Personal Computer Memory Card International Association (PCMIA) slot, and/or a high-definition multimedia interface (HDMI), can be associated with DPS 100. Device interface(s) 136 can be utilized to enable data to be read from or stored to corresponding removable storage device(s) 138, such as a compact disk (CD), digital video disk (DVD), flash drive, or flash memory card. In one or more embodiments, device interfaces 136 can further include General Purpose I/O interfaces, such as an Inter-Integrated Circuit ($I^2C$) Bus, System Management Bus (SMBus), and peripheral component interconnect (PCI) buses.

DPS 100 further includes a network interface device (NID) 140 and wireless networking device (WND) 142 that enables DPS 100 and/or components within DPS 100 to communicate and/or interface with other devices, services, and components that are located external to DPS 100. In one embodiment, DPS 100 may directly connect to one or more of these external devices, such as server 165 and devices 167a-n, via NID 140. In one or more embodiments, DPS 100 may utilize WND 142 to connect, via a wireless connection, to one or more of these external devices, independently from, or in combination with, NID 140. These externally located devices, services, and components can also interface with DPS 100 via an external network, such as example network 150, using one or more communication protocols. Network 150 can be a local area network, wide area network, personal area network, and the like, and the connection to and/or between network and DPS 100 can be wired or wireless or a combination thereof. For purposes of discussion, network 150 is indicated as a single collective component for simplicity. However, it is appreciated that network 150 can comprise one or more direct connections to other devices as well as a more complex set of interconnections as can exist within a wide area network, such as the Internet.

In one or more embodiments, DPS 100 may operate as a wireless communication device and WND 142 may be used to transmit data over a wireless network (e.g., a Wireless Fidelity (Wi-Fi) network, cellular network, Bluetooth® network (including Bluetooth® low energy (BLE) networks), a wireless ad hoc network (WANET), or personal area network (PAN)). In one embodiment, DPS 100 may be further equipped with an infrared (IR) device (not pictured) for communicating with other devices (e.g., devices 167a-n) using an IR connection. In another embodiment, WND 142 may be a short-range wireless device, including, but not limited to, a near field communication (NFC) device.

Figure 2:
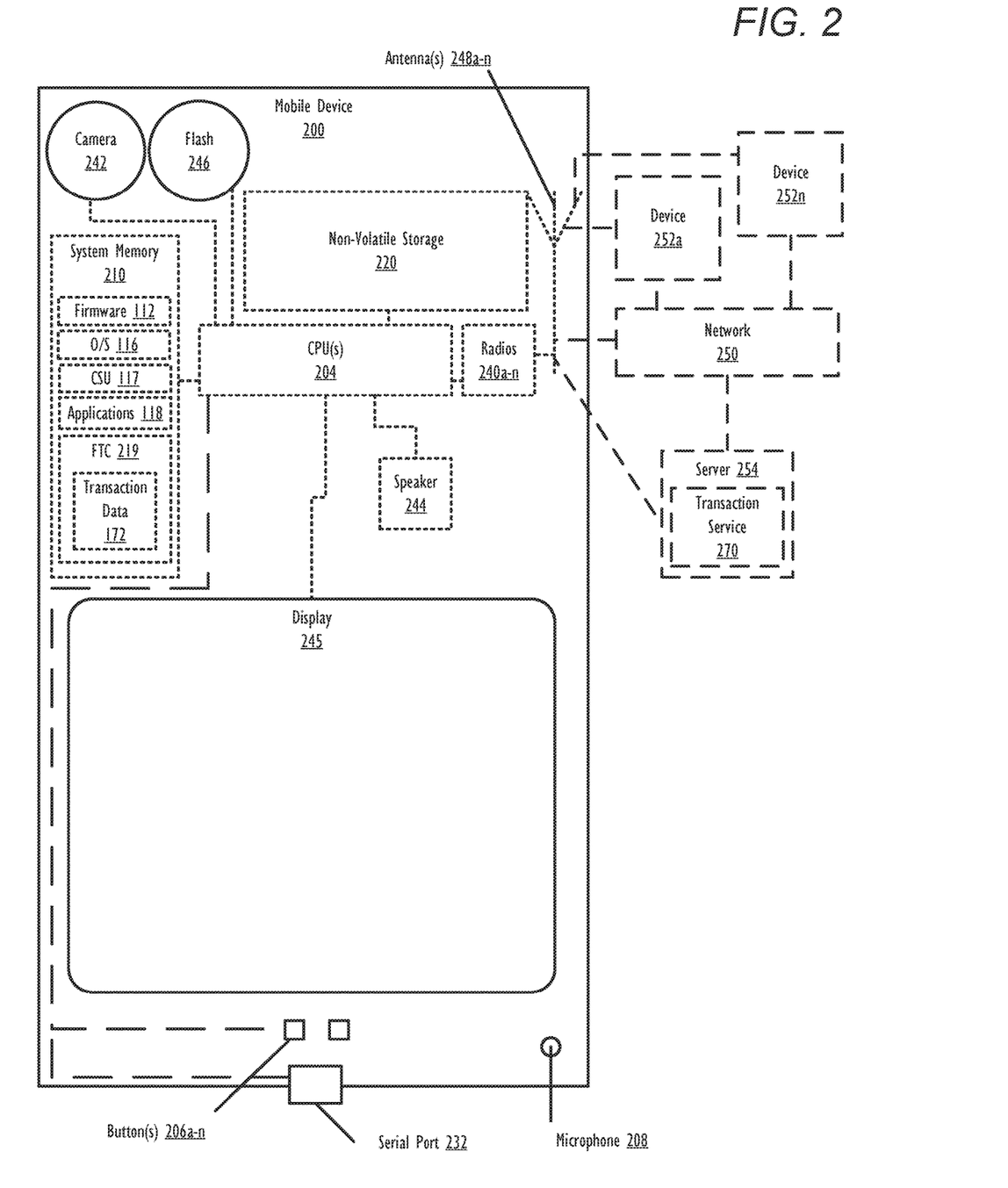
FIG. 2 illustrates a mobile device within which certain aspects of the disclosure can be practiced, in accordance with one or more embodiments.

FIG. 2 illustrates an example mobile device 200 within which one or more of the described features of the various embodiments of the disclosure can be implemented. Mobile device 200 includes at least one processor or central processing unit (CPU) 204. CPU 204 is coupled to memory 210 and/or non-volatile storage 220, within which firmware 112, CSU 117, and FTC 219 can be stored for execution on CPU 204. According to one aspect, CSU 117 executes within mobile device 200 to perform the various methods and functions described herein. For simplicity, CSU 117 is illustrated and described as a stand-alone or separate software/firmware/logic component, which provides the specific functions and methods described below. In one embodiment, FTC 219 is configured to initiate and/or execute financial transactions with at least one other device, including but not limited to, devices 252a-n, server 254, and any other devices connected to network 250. In one embodiment, FTC 219 may interface with a remote and/or cloud-based transaction service such as transaction service 270 of server 254.

As shown, mobile device 200 comprises several input devices and output devices that enable a user to interface with mobile device 200. In the illustrated embodiment, mobile device 200 includes camera sensor 242, camera flash 246, display 245, hardware buttons 206a-n, microphone 208, and speaker 244. In one embodiment, at least one of camera sensor 242 and microphone 208 may be used independently or in conjunction with each other to capture audio, image, and/or video media. Microphone 208 may be used to receive spoken input/commands from a user. Speaker 244 is used to output audio.

Hardware buttons 206a-n are selectable buttons which are used to receive manual/tactile input from a user to control specific operations of mobile device 200 and/or of applications executing thereon. In one embodiment, hardware buttons 206a-n may also include or may be connected to one or more sensors (e.g. a fingerprint scanner) and/or be pressure sensitive. Hardware buttons 206a-n may also be directly associated with one or more functions of a graphical user interface (not pictured) and/or functions of an OS, application, or hardware of mobile device 200. In one embodiment, hardware buttons 206a-n may include a keyboard.

Mobile device 200 also includes display 245, which is capable of displaying text, media content, and/or a graphical user interface (GUI) of firmware and/or one or more applications executing on mobile device 200. In one embodiment, display 245 is a touch screen that is also capable of receiving touch input from a user of mobile device 200 while interfacing with a displayed GUI. The GUI can be rendered by CPU 204 for viewing on display 245. In one embodiment, the GUI may include a virtual keyboard for receiving touch input in combination with display 245.

In at least one embodiment, mobile device 200 can include a plurality of virtual buttons or affordances that operate in addition to or in lieu of hardware buttons 206a-n. For example, mobile device 200 can be equipped with a touch screen interface and provide a virtual keyboard or other virtual icons for user interfacing therewith.

Mobile device 200 also includes serial port 232 (e.g., a USB (universal serial bus) port) which can operate as one of an input port, an output port, and a combination input/output port. Serial port 232 allows a direct physical connection to and communication of data with a second device. In one embodiment, serial port 232 may also connect to a power charger (not pictured) for charging a battery (not pictured) of mobile device 200. Mobile device may also include components for wireless (inductive) charging of the battery.

Mobile device 200 also includes one or more wireless radios 240a-n and can include one or more antenna(s) 248a-n that enable mobile device 200 to wirelessly connect to, and transmit and receive voice communication and/or data with, one or more other devices, such as devices 252a-n and server 254. In one or more embodiments, wireless radios 240a-n include at least one transceiver for exchanging data with one or more other devices. As a wireless device, mobile device 200 can transmit data over a wireless network 250 (e.g., a Wi-Fi network, cellular network, Bluetooth® network (including Bluetooth® low energy (BLE) networks), a wireless ad hoc network (WANET), or personal area network (PAN)). In one embodiment, mobile device 200 may be further equipped with an infrared (IR) device (not pictured) for communicating with other devices using an IR connection. In another embodiment, wireless radios 240a-n may include a short-range wireless device, including, but not limited to, a near field communication (NFC) device. In still another embodiment, mobile device 200 may communicate with one or more other device(s) using a wired or wireless USB connection.

FIG. 3 is a block diagram illustrating the directional flow of processes and data during a financial transaction between first device 310 and second device 320. The financial transaction is received at and processed by transaction service 330, in accordance with one or more embodiments. As illustrated by FIG. 3, first device 310 includes CSU 117, financial transaction client (FTC) 314, and pre-established minimum connection service criteria 304, which establishes a set of requirements for a connection with transaction service 330. Also as illustrated, second device 320 includes CSU 117, FTC 324, and minimum connection service criteria 304.

In the embodiment illustrated by FIG. 3, first device 310 is configured to establish data pipe 350 with second device 320. Data pipe 350 is utilized for routing second transaction data 326 received via data pipe 350 from second device 320 to transaction service 330. It should be noted that first device 310 and second device 320 may be configured as DPS 100, mobile device 200, or another electronic device that includes the functional hardware and software components to perform the respective functions of first device 310 and/or second device 320 via execution of CSU 117. In one embodiment, transaction service 330 is provided as a computer system executing specific code that enables transaction service 330 to function as a server (e.g. server 165 and server 254) that processes peer-to-peer financial transactions between two parties. In one or more embodiments, transaction service 330 is provided by a device/server associated with a financial entity, such as a bank or credit card company.

In the described embodiments, transaction service 330 processes financial transaction 302 between first device 310 and second device 320 in conjunction with financial transaction client (FTC) 314 and FTC 324, respectively. FTC 314 and FTC 324 are each associated with a respective client, account, and/or user. FTC 314 and FTC 324 provide access, during an authenticated login, to funds and/or resources associated with the respective client, account, and/or user. In response to initiation of financial transaction 302, FTC 314 generates first transaction data 316 at first device 310. Similarly, in response to initiation of financial transaction 302, FTC 324 generates second transaction data 326 at second device 320. First transaction data 316 and second transaction data 326 include information that identifies a particular transaction service (i.e., transaction service 330) to be used to process financial transaction 302 and authorizes that particular transaction service to perform/execute financial transaction 302. In the illustrated embodiment, FTC 314 and FTC 324 are configured to process financial transaction 302 via a same transaction service (transaction service 330).

In another embodiment, transaction service 330 may include multiple transaction services and/or FTC 314 and FTC 324 may be configured to process financial transaction 302 via different transaction services. In this alternate embodiment, the different transaction services collaborate/intercommunicate to facilitate the processing and completion of financial transaction 302 and one or more of the different transaction services may communicate with first device 310 and second device 320 (via first device 310 and data pipe 350).

In order to process financial transaction 302, transaction service 330 must first receive both first transaction data 316 from first device 310 and second transaction data 326 from second device 320. In one embodiment, execution of financial transaction 302 by transaction service 330 may result in an exchange of funds between a first party associated with first device 310 and a second party associated with second device 320.

In one embodiment, first transaction data 316 and/or second transaction data 326 may be encrypted using an encryption key (and/or hash code) that is shared between a corresponding device and transaction service 330. In this embodiment, in response to receiving first transaction data 316 and/or second transaction data 326, transaction service 330 may first decrypt first transaction data 316 and/or second transaction data 326 using the shared encryption keys prior to executing financial transaction 302.

In one or more embodiments of the invention, first device 310 detects initiation of financial transaction 302 with second device 320, and which requires processing by transaction service 330. The initiation of financial transaction 302 includes an exchange of transaction information (e.g., an invoice or request to pay for goods or services) and/or authentication codes between first device 310 and second device 320 by any wired or wireless means (e.g., over an NFC connection, Bluetooth® connection, or wireless ad hoc network). In one embodiment, the financial transaction is initiated by first device 310. For example, first device 310 may initiate a financial transaction with second device 320 by transmitting an invoice to second device 320 or by initiating a checkout procedure with second device 320. In another embodiment, the initiation of financial transaction 302 may be triggered responsive to a physical touching of first device 310 to second device 320, such as a physical tapping of first device 310 and second device 320 which causes the transaction information to be exchanged between first device 310 and second device 320 via an NFC connection. In another embodiment, financial transaction 302 may be initiated by second device 320 and detected by first device 310.

In the illustrated embodiment, first device 310 is connected to transaction service 330 via primary connection 312 that meets minimum connection service criteria 304. As provided above, minimum connection service criteria 304 establishes baseline requirements for a connection between a device and transaction service 330. A connection between a device and transaction service 330 that does not meet minimum connection service criteria 304 is considered a limited connection that is not to be used for the exchange of transaction data. It should also be noted that a lack of any connection to transaction service 330 also constitutes a failure to satisfy minimum connection service criteria 304. In one or more embodiments, minimum connection service criteria 304 establishes a minimum throughput and/or speed for a connection to transaction service 330. In another embodiment, minimum connection service criteria 304 establishes a maximum number of connection hops/intermediate connections for a connection between a device and transaction service 330. It is appreciated that other parameters may be utilized, in alternate embodiments, to determine minimum connection service criteria 304, without limitation.

Second device 320 may be connected to transaction service 330 via secondary connection 322. In response to detecting the initiation of financial transaction 302, first device 310 transmits first transaction data 316 to transaction service 330 and determines whether second device 320 is connected to transaction service 330 using at least one connection that satisfies minimum connection service criteria 304. In response to determining that secondary connection 322 has not yet been confirmed as satisfying minimum connection service criteria 304, first device 310 may send a request to second device 320 that causes second device 320 to perform a testing of secondary connection 322, to determine whether secondary connection 322 satisfies minimum connection service criteria 304. Second device 320 may then return the results of the test to first device 310. In another embodiment, instead of sending a request to second device 320 that causes second device 320 to perform a testing of secondary connection 322, first device 310 may receive, responsive to the initiation of financial transaction 302, a notification from second device 320 that identifies whether secondary connection 322 satisfies minimum connection service criteria 304. In embodiment, in response to determining second device 320 has a connection to transaction service 330 that satisfies connection service criteria 304, financial transaction 302, first device 310 and second device 320 independently communicate first transaction data 316 and second transaction data 326 to transaction service 330, which causes transaction service 330 to process financial transaction 302.

As provided the illustrated embodiment in FIG. 3, secondary connection 322 between second device 320 and transaction service 330 is broken (and thus does not meet connection service criteria 304). It should be noted that in the embodiments provided by FIGS. 3-5 that either of first device 310 and second device 320 may be the sender or recipient of funds in financial transaction 302. Thus, either first device 310 or second device 320 may be a customer or a merchant/recipient and, either device may have a limited connection to transaction service 330.

In response to determining secondary connection 322 does not satisfy connection service criteria 304, first device 310 generates secure initiation trigger 340. Secure initiation trigger 340 includes instructions that, when received by second device 320, causes second device 320 to establish data pipe 350 with first device 310. Secure initiation trigger 340 may also include configuration instructions 342 that configure FTC 324, to transmit second transaction data 326 to first device 310. Additionally, secure initiation trigger 340 may also identify the particular transaction service (i.e., transaction service 330) to be used to process financial transaction 302.

Data pipe 350 represents any connection medium between first device 310 and second device 320 that can be or is used, by second device 320, to transmit second transaction data 326 for financial transaction 302 to first device 310. In response to receiving second transaction data 326, first device 310 automatically routes second transaction data 326 to transaction service 330. In another embodiment, first device 310 may package first transaction data 316 and second transaction data 326 together before transmitting the combined transaction data to transaction service 330 via primary connection 312. In one embodiment, data pipe 350 is a direct connection between first device 310 and second device 320 including, but not limited to, an NFC connection, Bluetooth® connection, wireless ad hoc network, or infrared connection. In one embodiment, data pipe 350 may be provided via a different connection than was previously used to initiate financial transaction 302. For example, an NFC connection may be used to initiate financial transaction 302 and a Bluetooth® connection is used to establish data pipe 350. In another example, a mobile hotspot and/or tethering connection may be used to initiate financial transaction 302 and/or establish data pipe 350. In another embodiment, data pipe 350 may be provided via a same connection previously used to initiate financial transaction 302. In another embodiment, data pipe 350 may be an indirect connection between first device 310 and second device 320, such an indirect wireless connection, facilitated by a wireless router (not pictured). It should also be noted that in one or more embodiments, in response to financial transaction 302 being completed by transaction service 330, first device 310 may receive, via primary connection 312, second receipt (SR) 328 that is intended for second device 320, as is described in greater detail below. In response to receiving SR 328, first device may route SR 328 to second device 320 via data pipe 350.

In one or more embodiments, data pipe 350 may be restricted to being only utilized to transmit transaction data (e.g., first transaction data 316 and second transaction data 326) and/or data associated with transaction service 330, financial transaction 302 and/or a FTC (e.g., FTC 314 and FTC 324). In one embodiment, a device sending data over data pipe 350 may block any outbound communications that do not include a transaction data and/or that are not associated with a FTC and/or transaction service 330. In one embodiment, first device 310 may filter out and/or reject any received communications from second device 320 over data pipe 350 other than second transaction data 326, and/or that is not associated with financial transaction 302 and/or transaction service 330. A unique identification may be provided within the header of second transaction data 326 that identifies the specific data as being a part of financial transaction 302.

In response to first device 310 receiving second transaction data 326 from second device 320, first device 310 automatically reroutes second transaction data 326 received over data pipe 350 to transaction service 330 via primary connection 312 to transaction service 330. After processing of financial transaction 302 using first transaction data 316 and second transaction data 326 by transaction service 330, first device 310 may receive first receipt (FR) 318 and/or second receipt (SR) 328. FR 318 includes a payment confirmation and/or transaction receipt that is associated with financial transaction 302 and that is intended for first device 310. SR 328 includes a payment confirmation and/or transaction receipt that is associated with financial transaction 302 and that is intended for second device 320. In response to receiving a SR 328 via primary connection 312, first device 310 may route SR 328 to second device 320 via data pipe 350. In one or more embodiments, in response to delivering SR 328 to second device 320, first device 310 may automatically disconnect data pipe 350. In an alternate embodiment, first device 310 may automatically disconnect data pipe 350 in response to determining all of second transaction data 326 has been received via data pipe 350 and/or routed to transaction service 330 via primary connection 312.

In another embodiment, as shown by FIG. 4, second device 320 generates and transmits secure initiation trigger 340 to first device 310. In the embodiment provided by FIG. 4, secure initiation trigger 340 includes instructions that, when received by first device 310, causes first device 310 to establish data pipe 350 with second device 320. Secure initiation trigger 340 may also include instructions that configure FTC 314, to receive second transaction data 326. Additionally, secure initiation trigger 340 may also identify the particular transaction service (i.e., transaction service 330) to be used to process financial transaction 302.

FIG. 4 also illustrates that secondary connection 322 between second device 320 and transaction service 330 is broken (and thus does not meet connection service criteria 304). In the embodiment illustrated by FIG. 4, second device 320 is configured to establish data pipe 350 with first device 310 and route second transaction data 326 to first device 310 via data pipe 350. In this alternate embodiment, second device 320 generates and transmits secure initiation trigger 340, including configuration instructions 342, to first device 310. In the embodiment provided by FIG. 4, configuration instructions 342 include instructions to configure FTC 314 at first device 310 to reroute, to transaction service 330, any received transaction data (e.g., second transaction data 326). In one or more embodiments, FTC 314 may only reroute transaction data (e.g., second transaction data 326) that is (i) associated with financial transaction 302 and (ii) is received from second device 320 via data pipe 350. Following transmission of secure initiation trigger 340 to first device 310, second device 320 may receive, via data pipe 350, confirmation 444, which indicates that first device 310 is ready to: (i) accept second transaction data 326 via data pipe 350 and (ii) route second transaction data 326 to transaction service 330. In response to receiving confirmation 444, second device 320 transmits second transaction data 326 to first device 310 via data pipe 350.

In one or more embodiments, second device 320 may determine whether all of second transaction data 326 has been transmitted to first device 310 via data pipe 350. In response to determining that all of second transaction data 326 has been transmitted to first device 310, second device 320 may automatically disconnect data pipe 350. Additionally, or alternatively, after transmitting second transaction data 326 to first device 310, second device 320 may issue a delivery confirmation to first device 310 that instructs first device 310 to respond with a notification that indicates whether all of second transaction data 326 has been received and/or all of second transaction data 326 has been forwarded to transaction service 330. In response to receiving a notification that indicates all of second transaction data 326 has been received and/or all of second transaction data 326 has been forwarded to transaction service 330, second device 320 may automatically disconnect data pipe 350. In another embodiment, second device 320 may automatically disconnect data pipe 350 in response to receiving SR 328.

In another embodiment, as shown by FIG. 5 primary connection 312 between first device 310 and transaction service 330 is broken. In the embodiment provided by FIG. 5, secondary connection 322 between transaction service 330 and second device 320 meets minimum connection service criteria 304. After financial transaction 302 is initiated, one of first device 310 and second device 320 generates secure initiation trigger 340, which contains configuration instructions 342, and transmits secure initiation trigger 340 (including configuration instructions 342) to the other of first device 310 and second device 320.

In one embodiment, first device 310 detects the failure of primary connection 312 to transaction service 330. First device may then generate and transmit, to second device 320, secure initiation trigger 340, which contains configuration instructions 342 that configure FTC 324 at second device 310 to reroute, to transaction service 330, any received transaction data (e.g., first transaction data 316) that is (i) associated with financial transaction 302 and (ii) is received from first device 310 via data pipe 350.

In another embodiment, first device 310 may receive secure initiation trigger 340 from second device 310. In this embodiment, in response to receiving secure initiation trigger 340, first device 310 extracts configuration instructions 342 from received secure initiation trigger 340 and configures a local transaction client (e.g., FTC 314) to automatically transmit all of first transaction data 316 to second device 320 via data pipe 350 for rerouting by second device 320 to transaction service 330 over secondary connection 322.

In response to data pipe 350 being established between first device 310 and second device 320, first device 310 transmits first transaction data 316 to second device 320, which reroutes first transaction data 316 to transaction service 330 via secondary connection 322. Second device 320 also transmits second transaction data 326 to transaction service 330 via secondary connection 322.

After processing of financial transaction 302 using first transaction data 316 and second transaction data 326 by transaction service 330 has completed, first device 310 may receive FR 318. In one or more embodiments, FR 318 is first received by second device 320 and rerouted from second device 320 to first device 310 via data pipe 350. In response to receiving FR 318, first device 310 may automatically disconnect data pipe 350. In an alternative embodiment, in response to receiving FR 318, first device 310 may transmit a notification to second device 310 that indicates FR 318 has been received, and which causes second device 320 to automatically close data pipe 350. It should also be noted that second device 320 may also receive SR 328 from transaction service 330 via secondary connection 322 in response to processing of financial transaction 302 by transaction service 330 completing. In still another embodiment, first device 310 may automatically disconnect data pipe 350 in response to transmitting all of first transaction data 316 to second device 320 via data pipe 350 or in response to receiving a notification from second device 320 that indicates all of first transaction data 316 has been received and/or rerouted to transaction service 330. It should also be noted that in the embodiment provided by FIG. 5, that either of first device 310 or second device 320 may initiate financial transaction 302 and/or generate and transmit secure initiation trigger to the other device from among first device 310 or second device 320.

Figure 6:
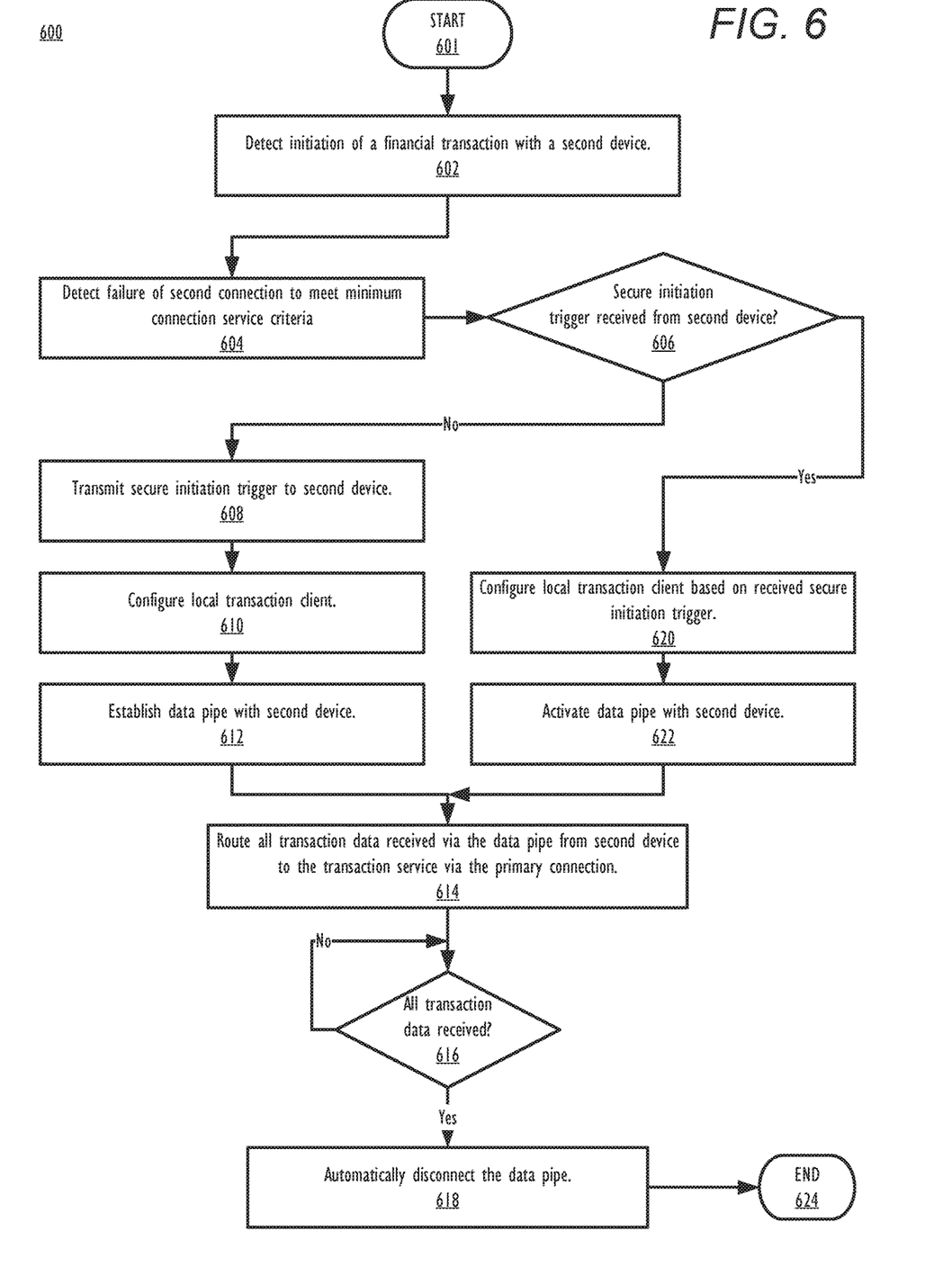
FIG. 6 is a flow chart illustrating a method for routing transaction data received from a second device to a transaction service, in accordance with one or more embodiments.

Referring now to FIG. 6, there is depicted a high-level flow-chart illustrating a method by which a first device, serving as an intermediary device between a second device and a transaction service, facilitates transmission of financial transaction data received via a data pipe from a second device to the transaction service, in accordance with one or more embodiments of the present disclosure. Aspects of the method are described with reference to the components of FIGS. 1-3. Several of the processes of the method provided in FIG. 6 can be implemented by a processor (e.g., CPU 104 or CPU 204) executing software code of respective CSU 117 within a generic data processing system (e.g., FIG. 1) or mobile device (e.g., FIG. 2). The method processes described in FIG. 6 are generally described as being performed by first device 310.

Method 600 commences at initiator block 601 then proceeds to block 602. At block 602, first device 310 detects the initiation of financial transaction 302 with second device 320. As described above, either first device 310 or second device 320 may initiate financial transaction 302. In order to process financial transaction 302, transaction service 330 requires second device 320 to access and/or exchange data (e.g., transaction data 326) with transaction service 330. At block 604, first device 310 determines that secondary connection 322 fails to meet minimum connection service criteria 304. At decision block 606, first device 310 determines whether secure initiation trigger 340 has been received from second device 320.

In response to determining at block 606 that secure initiation trigger 340 has been received from second device 320, method 600 continues to block 620. At block 620, first device 310 extracts configuration instructions 342 from received secure initiation trigger 340 and configures a local transaction client (e.g., FTC 314). FTC 314 is configured with required communication routing information (for transaction service 330), if required, and other identification information to be able to automatically route all of second transaction data 326 received from second device 320, via data pipe 350, to transaction service 330 over primary connection 312. At block 622, first device 310 activates data pipe 350 based on the received configuration instructions 342. The method then proceeds to block 614.

In response to determining secure initiation trigger 340 has not been received from second device 320, method 600 continues to block 608 and first device 310 generates and transmits secure initiation trigger 340, to second device 320. As described above, secure initiation trigger 340 includes configuration instructions 342, which include instructions to: (i) interconnect first device 310 and second device 320 via data pipe 350 and (ii) configure/trigger a financial transaction client (FTC 324) at second device 320 to route second transaction data 326 intended for transaction service 330 to first device 310 via data pipe 350. At block 610, first device 310 configures a local transaction client (e.g., FTC 314) to be able to automatically route second transaction data 326 received from second device 320 via data pipe 350 to transaction service 330 over primary connection 312. At block 612, first device 310 establishes and/or activates data pipe 350 to interconnect first device 310 and second device 320.

At block 614, first device 310 receives second transaction data 326 from second device 320 via data pipe 350, and routes the received second transaction data 326 to transaction service 330 over primary connection 312. At block 616, first device 310 determines whether all of second transaction data 326 has been received from second device 320 and forwarded to transaction service 330 over primary connection 312. In response to determining all of second transaction data 326 has been received by first device 310 and routed to transaction service 330 over primary connection 312, method 600 proceeds to block 618 where first device 310 automatically disconnects data pipe 350. Method 600 then terminates at end block 624.

Figure 7:
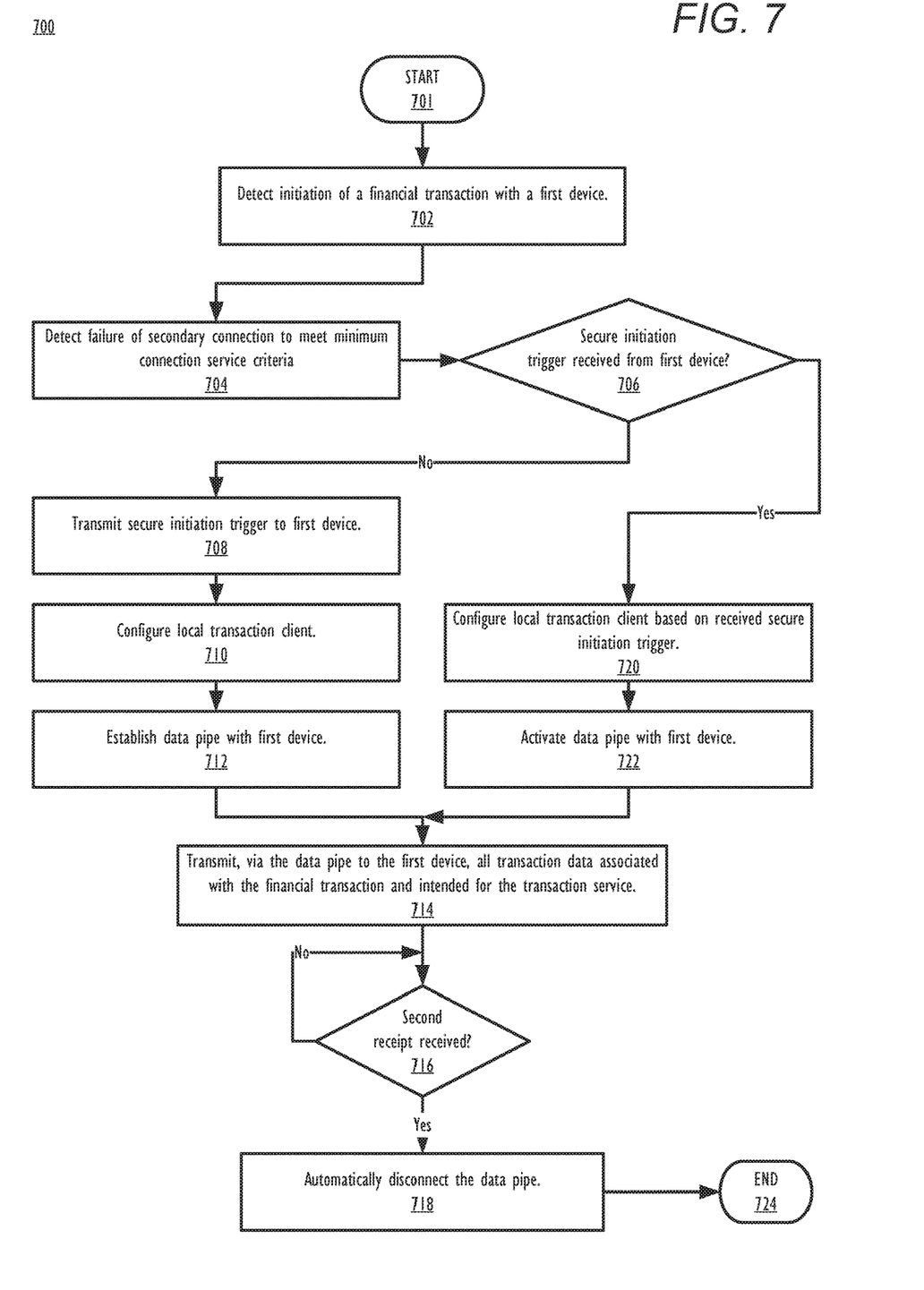
FIG. 7 is a flow chart illustrating a method for transmitting transaction data associated with a financial transaction and intended for the transaction service to a first device, in accordance with one or more embodiments.

Referring now to FIG. 7, there is depicted a high-level flow-chart illustrating a method for transmitting, from a second device, transaction data associated with a financial transaction and intended for transaction service to a first device, in accordance with one or more embodiments of the present disclosure. Aspects of the method are described with reference to the components of FIGS. 1-2 and 4. Several of the processes of method 700 provided in FIG. 7 can be implemented by a processor (e.g., CPU 104 or CPU 204) executing software code of respective CSU 117 within a generic data processing system (e.g., FIG. 1) or mobile device (e.g., FIG. 2). The method processes described in FIG. 7 are generally described as being performed by second device 320.

Method 700 commences at initiator block 701, then proceeds to block 702. At block 702, second device 320 initiates financial transaction 302 with first device 310. In an alternate embodiment, second device 320 detects, at block 702, the initiation of financial transaction 302 with first device 310. At block 704, second device 320 detects that secondary connection 322 fails to meet minimum connection service criteria 304. At decision block 706, second device 320 determines whether secure initiation trigger 340 has been received from first device 310.

In response to determining at block 706 that secure initiation trigger 340 has been received from first device 310, method 700 continues to block 720. At block 720, second device 320 extracts configuration instructions 342 from received secure initiation trigger 340 and configures a local transaction client (e.g., FTC 324). FTC 324 is configured with required communication routing information (for transaction service 330), if required, and other identification information to be able to automatically transmit all of second transaction data 326 to first device 310 via data pipe 350 for rerouting by first device 310 to transaction service 330 over primary connection 312. At block 722, second device 320 activates data pipe 350 based on configuration instructions 342. The method then proceeds to block 714.

In response to determining secure initiation trigger 340 has not been received from first device 310, method 700 continues to block 708 and second device 320 generates and transmits secure initiation trigger 340 to first device 310. As described above, secure initiation trigger 340 includes configuration instructions 342. At block 710, second device 320 configures a local transaction client (e.g., FTC 324) to automatically transmit all of second transaction data 326 to first device 310 via data pipe 350 for rerouting by first device 310 to transaction service 330 over primary connection 312. At block 712, second device 320 establishes and/or activates data pipe 350 to interconnect first device 310 and second device 320.

At block 714, second device 320 transmits second transaction data 326 to first device 310 via data pipe 350. At block 716, second device 320 determines whether SR 328 has been received. In response to determining SR 328 has been received, method 700 proceeds to block 718 and second device 320 automatically disconnects data pipe 350. Method 700 then terminates at end block 724. In response to determining SR 328 has not yet been received, second device 320 maintains data pipe 350 with first device 310 until SR 328 has been received.

In the above-described flow charts, one or more of the method processes may be embodied in a computer readable device containing computer readable code such that a series of steps are performed when the computer readable code is executed on a computing device. In some implementations, certain steps of the methods are combined, performed simultaneously or in a different order, or perhaps omitted, without deviating from the scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method comprising:
    detecting, at a first device, initiation of a financial transaction with a second device, wherein the financial transaction is initiated to be remotely processed by a transaction service, wherein the first device is a payer device connected to the transaction service via a primary connection which meets a minimum connection service criteria, and wherein the second device is a payee device, which defaults to complete the financial transaction by establishing and communicating second device transaction data over a second connection with the transaction service when the second connection to the transaction service also meets the minimum connection service criteria;
    in response to receiving, from the second device, a notification indicating that the second device does not have a connection meeting the minimum connection service criteria for connecting to the transaction service to complete an exchange of the second device transaction data of the financial transaction, establishing, utilizing a wireless radio of the first device having a transceiver for exchanging data with a connected wireless radio of the second device, a data pipe that directly connects the first device and the second device to enable transfer of the second device transaction data between the first and second devices; and
    in response to the data pipe being established, the first device: receiving, over the data pipe, the second device transaction data intended for forwarding to the transaction service from the second device, the second device transaction data being generated by a financial transaction client on the second device to provide access via an authenticated login to resources of a client, account, or user associated with the second device; and automatically routing, via the primary connection to the transaction service, the second device transaction data received over the data pipe from the second device, the second device transaction data comprising information that identifies a particular transaction service to be used to process the financial transaction, communication routing information for accessing the transaction service, and information that authorizes the transaction service to execute the financial transaction;
    wherein: the minimum connection service criteria identifies, for connections to the transaction service, at least one of at least one permitted type of connection and at least one restricted type of connection, and a minimum connection security level between a respective one of the first and the second device and the transaction service; the minimum connection service criteria establishes baseline requirements for a connection between each of the first device and the second device and the transaction service to be used for exchange of transaction data; and in response to the second device not having a second connection that meets the minimum connection service criteria, the second device utilizes the first device as an intermediary device to transmit the second device transaction data to the transaction service.

2. The method of claim 1, further comprising:
identifying that all transaction data from the second device for the financial transaction has been received by the transaction service; and
in response to identifying that all transaction data from the second device has been received by the transaction service, automatically disconnecting the data pipe.

3. The method of claim 1, further comprising: screening data received over the data pipe from the second device to allow only network traffic associated with the financial transaction to be transmitted over the data pipe, the screening comprising: identifying a unique identification provided within a header of the second device transaction data that identifies the second device transaction data as being part of the financial transaction; and filtering out and rejecting any received communications from second device over the data pipe that is not second device transaction data.

4. The method of claim 1, wherein establishing the data pipe further comprises:
transmitting, from the first device to the second device, a secure initiation trigger, which comprises instructions that causes the second device to:
interconnect the first device and the second device via the data pipe; and
configure the financial transaction client of the second device to route the transaction data intended for the transaction service to the first device via the data pipe; and
configuring a first financial transaction client of the first device to route second device transaction data received via the data pipe from the second device to the transaction service via the primary connection.

5. The method of claim 1, wherein establishing the data pipe further comprises:
receiving, at the first device from the second device, a secure initiation trigger, which comprises instructions to interconnect the first device and the second device via a data pipe; and
in response to receiving the secure initiation trigger:
extracting configuration instructions from the secure initiation trigger;
activating the data pipe to enable communication with the second device via the data pipe; and
configuring a financial transaction client of the first device to automatically route the second device transaction data received via the data pipe from the second device to the transaction service via the primary connection.

6. The method of claim 1, wherein the second device transaction data is encrypted using an encryption key of a shared encryption key pair shared between the second device and the transaction service and the second device transaction data received over the data pipe comprises the encryption key of the shared encryption key pair and the routing by the first device of the second device transaction data comprises providing the encryption key with the second deice transaction data to enable the transaction service to first decrypt the second device transaction data utilizing the shared encryption keys prior to executing the financial transaction.

7. The method of claim 1, further comprising:
in response to receiving, from the transaction service, a second receipt that is intended for the second device, forward the second receipt to the second device via the data pipe, the second receipt being received after routing the second device transaction data to the transaction service.

8. The method of claim 1, wherein the transaction service comprises multiple transaction services and each of financial transaction client of second device and first financial transaction client of first device are configured to process the financial transaction via respective, different transaction services.

9. The method of claim 1, wherein: each of the different transaction services collaborate and intercommunicate to facilitate processing and completion of the financial transaction and the particular financial service of the different transaction services communicates with the second device via the first device and the data pipe.

10. A first device comprising:
a memory having stored thereon a plurality of processing modules, including: a financial transaction client (FTC) that defaults the first device to complete a financial transaction by establishing and communicating over a connection with a financial service to complete the financial transaction when a connection with the financial transaction meets a minimum connection service criteria, and which reconfigures the first device to establish an intermediary connection with a second device participating in the financial transaction when the connection does not meet the minimum connection service criteria; and a connection sharing module that configures the first device to perform connection sharing measures;
a wireless radio having a transceiver for exchanging data with another connected device;
a processor that is coupled to the memory and the transceiver and which executes the plurality of processing modules, wherein:
the connection sharing module:
detects initiation of a financial transaction with a second device, wherein the financial transaction is remotely processed by a transaction service, wherein the first device is connected, via the transceiver, to the transaction service via a primary connection which meets a minimum connection service criteria, and wherein the second device does not have a connection to the transaction service that meets the minimum connection service criteria;
detects initiation of a financial transaction with a second device, wherein the financial transaction is one that is remotely processed by a transaction service, wherein the first device is a payer device connected, via the transceiver, to the transaction service via a primary connection which meets a minimum connection service criteria, and wherein the second device is a payee device that does not have a connection to the transaction service that meets the minimum connection service criteria;
in response to receiving, from the second device, a notification indicating that the second device does not have a connection meeting the minimum connection service criteria for connecting to the transaction service to complete an exchange of second device transaction data of the financial transaction, establishes, utilizing the transceiver and wireless radio, a data pipe that directly connects the first device and the second device to enable transfer of second device transaction data between the first and second devices; and in response to the data pipe being established: receives, over the data pipe, second device transaction data intended for forwarding to the transaction service from the second device, the second device transaction data being generated by a financial transaction client on the second device to provide access via an authenticated login to resources of a client, account, or user associated with the second device; and automatically routes, via the primary connection to the transaction service, the second device transaction data received over the data pipe from the second device, the second device transaction data comprising information that identifies a particular transaction service to be used to process the financial transaction, communication routing information for accessing the transaction service, and information that authorizes the particular transaction service to execute the financial transaction;

wherein: the minimum connection service criteria identifies, for connections to the transaction service, at least one of: at least one permitted type of connection and at least one restricted type of connection, and a minimum connection security level between a respective one of the first and the second device and the transaction service; the minimum connection service criteria establishes baseline requirements for a connection between each of the first device and the second device and the transaction service to be used for exchange of transaction data; in response to the second device not having a second connection that meets the minimum connection service criteria, the second device utilizes the first device as an intermediary device to transmit the second device transaction data to the transaction service.

11. The first device of claim 10, wherein the connection sharing module:

identifies that all transaction data for the financial transaction has been received by the transaction service from the second device; and in response to identifying that all transaction data from the second device has been received by the transaction service, automatically disconnects the data pipe.

12. The first device of claim 10, wherein the connection sharing module screens data received from the second device over the data pipe to allow only network traffic associated with the financial transaction to be transmitted over the data pipe by: identifying a unique identification provided within a header of the second device transaction data that identifies the second device transaction data as being part of the financial transaction; and filtering out and rejecting any received communications from second device over the data pipe that is not second device transaction data.

13. The first device of claim 10, wherein in establishing the data pipe, the connection sharing module:

transmits, to the second device, a secure initiation trigger, which comprises instructions to:
  interconnect the first device and the second device via the data pipe; and
  configure a financial transaction client of the second device to route the transaction data intended for the transaction service to the first device via the data pipe; and configures a financial transaction client to route all transaction data received via the data pipe from the second device to the transaction service via the primary connection.

14. The first device of claim 10, wherein in establishing the data pipe, the connection sharing module:

receives, at the transceiver from the second device, a secure initiation trigger, which comprises instructions to interconnect the first device and the second device via the data pipe; and in response to receiving the secure initiation trigger:
  activates the data pipe to enable communication with the second device via the data pipe; and
  configures a financial transaction client to route all transaction data received via the data pipe from the second device to the transaction service via the primary connection.

15. The first device of claim 10, wherein the FTC configures the processor to provide access, during an authenticated login at a particular financial service identified within the FTC, to resources associated with a respective client, account, and/or user associated with the device, the transaction data including information that identifies the particular transaction service and authorizing the particular transaction service to perform the financial transaction.

16. The device of claim 10, wherein determining that the second connection does not satisfied the minimum connection service criteria comprises the connection sharing module configuring the processor to:

in response to determining that second device has not confirmed that secondary connection satisfies the minimum connection service criteria: send a request to the second device that causes the second device to perform a test of the secondary connection to determine whether the secondary connection satisfies minimum connection service criteria; and receive a response to the request indicating a result of the test.

17. The device of claim 10, further comprising:

in response to determining that both the second device and first device have a connection to the at least one transaction service that satisfies the connection service criteria, independently communicating the first transaction data to a corresponding transaction service among the at least one transaction service, while the second device independently communicates the second transaction data to the particular transaction service, which triggers the at least one transaction service to process the financial transaction.

18. The device of claim 10, further comprising the connection sharing module configuring the processor to:

in response to financial transaction being completed by transaction service, receive, via the primary connection, a second receipt (SR) that is intended for the second device; and in response to receiving SR, routing the SR to the second device via data pipe.

19. A computer program product comprising:

a non-transitory computer readable storage device; and program code on the non-transitory computer readable storage device that when executed by a processor within a first device having at least one wireless radio and transceiver for exchanging data with another connected device, the program code configures the first device to perform the functions of:

detecting initiation of a financial transaction with a second device, wherein the financial transaction is initiated to be remotely processed by a transaction service, wherein the first device is a payer device connected to the transaction service via a primary connection which meets a minimum connection service criteria, and wherein the second device is a payee device, which defaults to complete the financial transaction by establishing and communicating over a second connection with the transaction service when the second connection to the transaction service also meets the minimum connection service criteria;

in response to receiving, from the second device, a notification indicating that the second device does not have a connection meeting the minimum connection service criteria for connecting to the transaction service to complete an exchange of second device transaction data of the financial transaction, establishing, utilizing a wireless radio of the first device having a transceiver for exchanging data with a connected wireless radio of the second device, a data pipe that directly connects the first device and the second device to enable transfer of second device transaction data between the first and second devices; and in response to the data pipe being established: receiving, over the data pipe, second device transaction data intended for forwarding to the transaction service from the second device, the second device transaction data being generated by a financial transaction client on the second device to provide access via an authenticated login to resources of a client, account, or user associated with the second device; and automatically routing, via the primary connection to the transaction service, the second device transaction data received over the data pipe from the second device, the second device transaction data comprising information that identifies a particular transaction service to be used to process the financial transaction, communication routing information for accessing the transaction service, and information that authorizes the particular transaction service to execute the financial transaction;

wherein: the minimum connection service criteria identify, for connections to the transaction service, at least one of at least one permitted type of connection and at least one restricted type of connection, and a minimum connection security level between a respective one of the first and the second device and the transaction service; the minimum connection service criteria establishes baseline requirements for a connection between each of the first device and the second device and the transaction service to be used for exchange of transaction data; in response to the second device not having a second connection that meets the minimum connection service criteria, the second device utilizes the first device as an intermediary device to transmit the second device transaction data to the transaction service.

\* \* \* \* \*